Dec. 7, 1948. O. F. HENSEL 2,455,579
APPARATUS FOR TREATING CHEESE
Filed Aug. 21, 1944
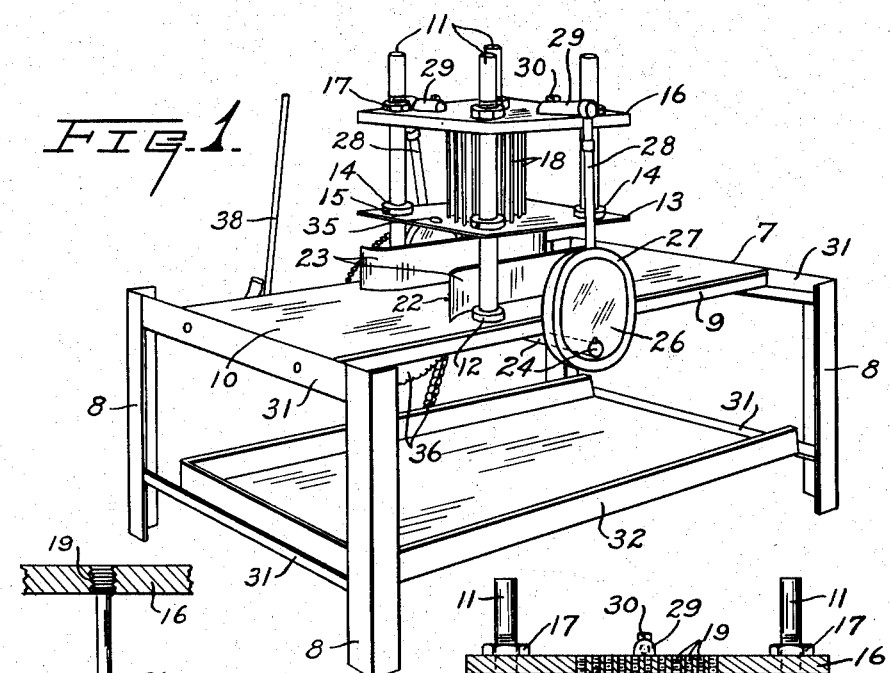
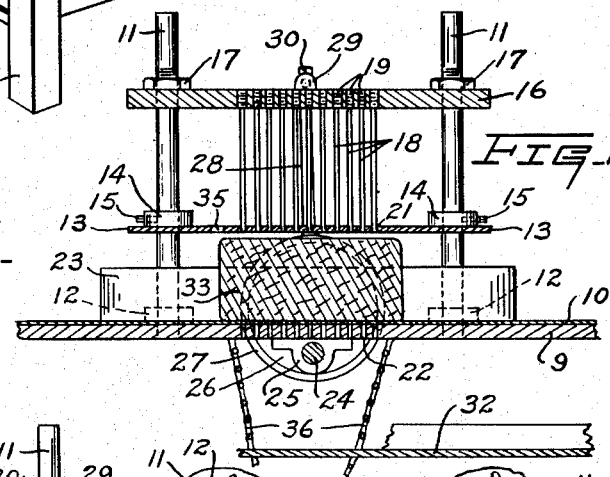
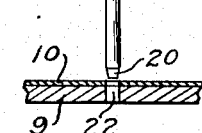
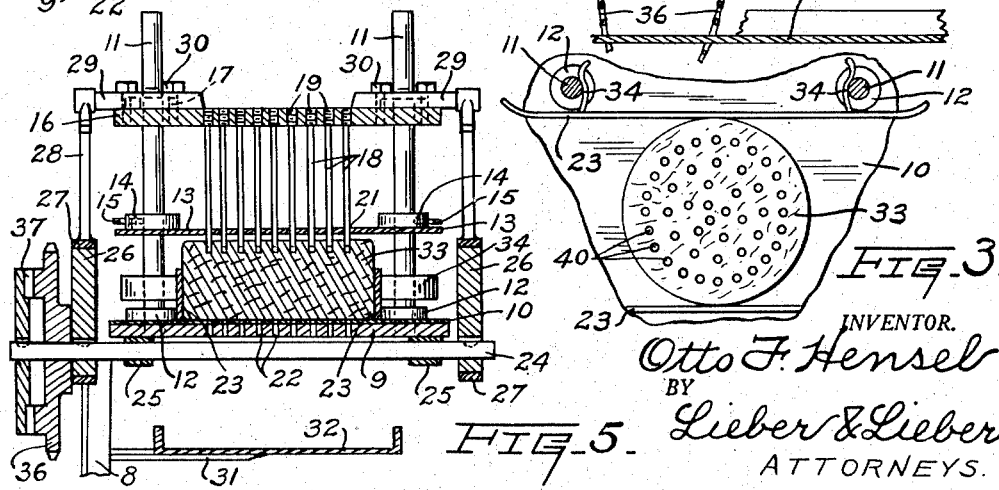
INVENTOR.
Otto F. Hensel
BY Lieber & Lieber
ATTORNEYS.

Patented Dec. 7, 1948

2,455,579

UNITED STATES PATENT OFFICE 2,455,579

APPARATUS FOR TREATING CHEESE

Otto F. Hensel, Hustisford, Wis.

Application August 21, 1944, Serial No. 550,347

3 Claims. (Cl. 31—46)

The present invention relates generally to improvements in the art of treating cheese, and relates more specifically to improvements in the construction and operation of mechanism for perforating or punching holes into certain types or classes of cheese.

The primary object of my invention is to provide a new and useful machine for quickly and effectively perforating successive batches or blocks of cheese in order to improve the quality of such products.

In the manufacture of "Roquefort" type cheese, commonly known as blue cheese, the interior of which abounds with so-called friendly bacterial growth in the form of flakes of mold, it is necessary in order to preserve the mold, to expose the same to the ambient atmosphere. If this is not done, the bacteria become dormant and the cheese will spoil, and in order to provide for such atmospheric exposure it has heretofore been customary to punch holes into the cakes or blocks of the commodity having the normally concealed mold flakes embedded therein. Due to the relatively brittle nature of such cheese, the perforating operation if not properly performed, will cause the cakes to split, and it has also been extremely difficult with the prior hand puncturing methods, to uniformly and properly perforate the relatively compact and solid bodies of cheese.

It is therefore a more specific object of this invention to provide improved instrumentalities for rapidly and thoroughly aerating blue cheese or the like, in an expeditious manner.

Another specific object of the present invention is to provide an improved blue cheese perforating machine which will simultaneously pierce each cake or block of the cheese with a multiplicity of properly spaced and clean cut perforations throughout the cheese body.

A further specific object of my invention is to provide an improved cheese perforator which is readily and safely manipulable to automatically puncture the successive cheeses with a multiplicity of regularly spaced holes, and which may also be conveniently maintained in highly sanitary condition.

Still another specific object of the invention is to provide a simple, compact and durable cheese perforating device which may be operated by a novice to produce highly satisfactory results, and which may also be manufactured at moderate cost.

An additional specific object of this invention is to provide an automatic cheese perforating mechanism, all parts of which are readily accessible for inspection and cleaning, which will uniformly perforate successive blocks of cheese without undesirable cracking or splitting, and which insures production of perfect perforations or holes in the body of the commodity.

These and other specific objects and advantages of my invention will be apparent from the following detailed description.

A clear conception of the features constituting the present improvement, and of the mode of constructing and of operating machines embodying the invention, may be had by referring to the drawing accompanying and forming a part of this specification wherein like reference characters designate the same or similar parts in the various views.

Fig. 1 is a perspective view of one of my improved cheese perforating machines, the driving motor and speed reducing gearing having been omitted;

Fig. 2 is a somewhat enlarged central vertical longitudinal section through a portion of the machine, showing a cheese in place;

Fig. 3 is a similarly enlarged transverse horizontal section through a fragment of the cheese perforating machine, showing a top view of a perforated cheese;

Fig. 4 is a further enlarged side elevation of one of the improved perforating needles or pins cooperating with fragments of adjacent structure; and Fig. 5 is a central vertical transverse section through the same machine, showing a cheese in the act of being perforated.

While the invention has been shown and described herein as having been embodied in a machine especially adapted to perforate cylindrical cakes or blocks of blue cheese of a definite size, it is not my desire or intent to unnecessarily restrict the scope of utility by virtue of this limited disclosure.

Referring to the drawing, the improved cheese perforating machine shown therein, comprises in general, a frame or table 7 having four corner posts or legs 8 and a rigid flat top 9, the latter preferably being provided with a lower stainless steel cover plate 10; four cylindrical upright posts 11 rigidly secured to the table top 9 and having base collars 12 over which the lower plate 10 is removably slip-fitted; a vertically adjustable horizontal medial plate 13 provided with rigid collars 14 slidably adjustable along the posts 11 and adapted to be fixed in various positions of adjustment by means of set screws 15 carried by the collars; a vertically movable top plate or head 16 having four corner openings slidably coacting with the posts 11, and being cooperable with stop nuts 17 secured to the posts for limiting the upward movement of the head plate 16; a plurality of parallel vertically reciprocable cylindrical needles or pins 18 detachably secured at their upper ends to the medial portion of the movable plate 16 by means of screw threads 19, and having lower tapered extremities 20 adapted to pass through openings 21 in the medial plate 13 across the gap between this plate and the table top 9 and through alined holes 22 formed in the lower plate 10 and top 9; parallel vertical resilient guides 23 detachably secured to the posts 11 within the space between the plates 13, 10; a transverse horizontal driving shaft 24 suspended from the under-side of the table top 9 by bearings 25 and having two laterally spaced similar eccentrics 26 secured thereto; annular straps 27 embracing the eccentrics 26 and having connecting rods 28 pivotally secured to brackets 29 attached to the head plate 16 by means of cap screws 30; and suitable mechanism for imparting periodic rotary motion to the shaft 24.

The table legs 8 and cross pieces 31 may be formed of standard angle iron, and a refuse collecting pan 32 may be slid laterally onto and off of the lower cross braces 31; and the table top 9 may be firmly but detachably secured to the upper cross braces 31 in any suitable manner, see Fig. 1. The stainless steel lower plate 10 may rest by gravity upon the solid table top 9, and the base collars 12 serve to normally maintain this plate 10 in proper position while permitting the same to be readily lifted away from the top 9 for cleansing purposes. The normally fixed but vertically adjustable medial plate 13, and the guides 23 may also be formed of stainless steel or the like, and the plate 13 should preferably be located as near to the tops of the cheese blocks 33 as possible, in order to cause the openings 21 therein to most effectively guide the perforating pins 18 into the cheese batches or bodies and to maintain these pins truly parallel during each perforating operation. The guides 23 are adapted to snugly coact with the opposite sides of each of the cylindrical cheese blocks 33 as shown in Fig. 3, and these guides 23 may be caused to coact with the base collars 12 and are detachably secured to the adjacent posts 11 by means of spring clips 34, see Figs. 3 and 5.

The upper reciprocable head plate 16 which is guided for vertical reciprocation by the fixed corner posts 11, should be sufficiently rigid to prevent possible deflection, and the perforating needles or pins 18 which are of special and improved construction, must be firmly attached to this head plate 16. The pins 18 are preferably formed of cylindrical stainless steel stock, and are of interchangeably similar construction, being spaced uniformly throughout the major area of the circular cheese cakes or blocks 33, see Figs. 3 and 4. The upper headed end of each perforating pin 18 is rigidly but detachably secured to the upper plate 16 by means of the screw threads 19, and the lower tapered extremities 20 of the pins 18 are blunt but must be accurately centralized with respect to the alined openings 21 and holes 22 of the plates 13, 10 respectively. The diameters of these openings 21 and holes 22 should also be only slightly larger than the diameters of the perforating pins 18, and the outermost of these pins should be located well within the peripheral border portions of the cheese blocks 33 while the inner pins 18 should not be arranged in radial planes, but should be irregularly disposed, as indicated in Fig. 3. One or more positioning holes 35 may also be provided in the intermediate plate 13, in order to enable the operator to properly centralize the successive cheese blocks 33 with respect to the circular group of pins 18.

The driving mechanism for imparting periodic rotary motion to the driving shaft 24 and eccentrics 26, may be of any suitable construction, adapted to impart relatively slow rotation to these eccentrics so as to impart harmonic motion to the head plate 16 and pins 18 thereby causing these perforating pins to slowly enter and leave the blocks 33 but to travel rapidly through the center of the mass of cheese. As shown, the driving mechanism comprises a chain drive 36 adapted to be driven at the desired speed from an electric motor or the like through speed reducing gearing, and a clutch 37 operable by a lever 38 pivotally mounted upon the main frame 7 to drivingly connect the shaft 24 to the chain drive 36, see Figs. 1 and 5. This driving mechanism should preferably be operable to cause the pins 18 to penetrate each of the properly positioned cheese blocks 33 only once, and the shaft 24 may hereafter be disconnected from its driving source when the head plate 16 has engaged the upper stop nuts 17 in any suitable manner. While the specific driving mechanism which is shown rather diagrammatically in the drawing, has proven highly successful and satisfactory in actual use, any other type of drive adapted to accomplish the desired results, may be substituted for that shown, without departing from the present invention.

During normal operation of my improved cheese perforating machine, the successive circular cheese blocks 33 may be slid along the lower plate 10 between the parallel guides 23 when the shaft 24 and eccentrics 26 are at rest and the pins 18 have been elevated to the position shown in Figs. 1 and 2. The positioning holes 35 in the medial plate 13 may then be utilized to centralize each block 33 with respect to the circular group of perforating pins 18, and whenever a cheese cake has been thus properly positioned, the operating lever 38 may be manipulated to cause the clutch 37 to connect the shaft 24 to the driving power source, whereupon the pins 18 will be forced downwardly through the cheese block 33 and will produce a multiplicity of parallel perforations 40 as illustrated in Fig. 3. During this perforating operation, the openings 21 in the medial plate 13 will maintain the pins 18 parallel and will cause these pins to move in accurate alinement with the corresponding holes 22 formed in the lower plate 10 and table top 9; and the cheese cores which are removed by the downwardly advancing pins 18, are deposited by gravity upon the pan 32 from which the accumulation of cores may be periodically removed. While the pins 18 are advancing through the cheese blocks, the revolving eccentrics 26 will cause the tapered ends 20 of these pins to slowly pierce the top and bottom surfaces of the blocks 33 and to travel faster through the internal zones, and this motion obviates undesirable breakage of the blocks of cheese. The tapered ends 20 also tend to prevent chipping or breakage at the outer ends of the holes 40 and thus produce smooth and clean perforations, and these tapered ends also compensate for slight bending of the pins 18 thus insuring proper entry of the pins within the lower holes 22. After the perforating operation is completed, the pins 18 will be quickly withdrawn from the holes 40, and returned to the position shown in Figs. 1 and 2, whereupon the rotation of the shaft 24 will be arrested and the upper head plate 16 will stop.

It is to be noted, that slight variations in diameter of the successive cheese blocks 33, will be compensated for by the resiliency of the guides 23, and these guides may be readily removed for cleaning. When the guides 23 have been removed, the lower plate 10 may also be lifted away from its positioning collars 12 and thoroughly cleaned, and by removing the cap screws 30, stop nuts 17, and releasing the set screws 15, the entire machine may be quickly dismantled. The structure may however be just as rapidly reassembled, thus making it possible to inspect and to thoroughly cleanse all portions of the mechanism. While the perforating pins 18 are normally firmly attached to the head plate 16 by the screw threads 19, they may be easily removed for replacement purposes, and since these pins are interchangeably similar, they will fit within any of the threaded sockets in the plate 16.

From the foregoing detailed description it will be apparent that my present invention provides an improved cheese perforating unit which is simple, compact and durable in construction, and which is also highly effective in use and conveniently operable. All parts of the improved structure are of simple and sturdy construction, and the machine is obviously so constructed that it may be maintained in highly sanitary condition at all times. The improved mechanism by virtue of the special construction of the pins 18 and of the drive and other parts associated therewith, insures the production of clean cut holes 40 properly located so as to avoid splitting of the block 33, and the pins 18 may either be disposed on circles concentric with the cheese block axes, or spirally thereabout, but should not be disposed with their axes located in radial or diametral planes. The improved perforating units have proven highly satisfactory and successful in commercial operation, and may be manufactured from stock such as standard angle irons, metal plates and bars, at relatively moderate cost.

It should be understood that it is not desired to limit this invention to the exact details of construction and operation of the machine herein shown and described, for various modifications within the scope of the appended claims may occur to persons skilled in the art.

I claim:

1. In combination, a support having rigid upright posts and a group of holes therein between said posts, a lower plate resting upon said support and having a group of holes registering with said support holes, said lower plate resting by gravity upon said support and being maintained in position by said posts, guides coacting with said plate and said posts to hold successive cheese blocks in position over said holes, a medial plate secured to said posts and having a group of openings in alinement with said holes, an upper plate slidable along said posts toward and away from said medial and lower plates, a group of parallel perforating pins carried by said upper plate and being reciprocable within said openings and across the space between said lower and medial plates, and means for periodically reciprocating said upper plate along said posts.

2. In combination, a support having rigid upright posts and a group of holes therein between said posts, a lower plate detachably mounted upon said support and having a group of holes precisely registering with said support holes, said lower plate being maintained in position by said posts, guides coacting with said plate and said posts to hold successive cheese blocks in position over said holes, a medial plate secured to said posts and having a group of openings in alinement with said holes, an upper plate slidable along said posts toward and away from said medial and lower plates, a group of parallel perforating pins carried by said upper plate and having cylindrical medial portions reciprocable within said openings and also having tapered extreme lower ends movable across the space between said lower and medial plates, and means for periodically reciprocating said upper plate along said posts.

3. In combination, a horizontal support having perforations therein, a lower plate detachably mounted upon said support and having a group of holes therein registering with said perforations, posts extending upwardly from said support on opposite sides of said group, a medial plate adjustably secured to said posts and having openings in alinement with said holes, an upper plate slidable along said posts above said medial plate, a group of parallel pins reciprocable within said openings and having cylindrical medial portions adapted to snugly slidably engage said holes and being provided with tapered extreme lower ends movable across the space between said support and said medial plate while their upper ends are secured to said upper plate, and means for periodically moving said upper plate to simultaneously reciprocate said pins.

OTTO F. HENSEL.

REFERENCES CITED

The following references are of record in the file of this patent:

UNITED STATES PATENTS

| Number | Name | Date |
|---|---|---|
| 167,850 | Mildren | Sept. 21, 1875 |
| 355,767 | Knowlton | Jan. 11, 1887 |
| 802,444 | Date | Oct. 24, 1905 |
| 1,174,138 | Gauvreau | Mar. 7, 1916 |
| 1,813,837 | Boland | July 7, 1931 |

FOREIGN PATENTS

| Number | Country | Date |
|---|---|---|
| 381,852 | France | Nov. 22, 1907 |